United States Patent
Kulkarni et al.

(10) Patent No.: US 11,618,479 B2
(45) Date of Patent: Apr. 4, 2023

(54) SYSTEM, METHOD AND CONTROLLER FOR GRAPH-BASED PATH PLANNING FOR A HOST VEHICLE

(71) Applicant: GM GLOBAL TECHNOLOGY OPERATIONS LLC, Detroit, MI (US)

(72) Inventors: Divya P. Kulkarni, San Francisco, CA (US); Hyukseong Kwon, Thousand Oaks, CA (US); Kenji Yamada, Los Angeles, CA (US); Tiffany J. Hwu, San Diego, CA (US); Kyungnam Kim, Oak Park, CA (US); Rajan Bhattacharyya, Sherman Oaks, CA (US); Michael J. Daily, Thousand Oaks, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 233 days.

(21) Appl. No.: 17/114,822

(22) Filed: Dec. 8, 2020

(65) Prior Publication Data
US 2022/0177001 A1    Jun. 9, 2022

(51) Int. Cl.
*B60W 60/00* (2020.01)
*G05D 1/02* (2020.01)

(52) U.S. Cl.
CPC ....... *B60W 60/0027* (2020.02); *G05D 1/0214* (2013.01); *B60W 2520/10* (2013.01); *B60W 2520/12* (2013.01); *B60W 2552/10* (2020.02); *B60W 2552/20* (2020.02); *B60W 2554/4041* (2020.02); *B60W 2554/4042* (2020.02); *B60W 2554/4043* (2020.02); *B60W 2554/4044* (2020.02); *B60W 2554/801* (2020.02); *B60W 2554/802* (2020.02); *B60W 2554/803* (2020.02); *B60W 2554/804* (2020.02); *B60W 2555/20* (2020.02); *B60W 2555/60* (2020.02); *G05D 2201/0213* (2013.01)

(58) Field of Classification Search
CPC .................. G05D 1/0214; B60W 60/0027
See application file for complete search history.

(56) References Cited

U.S. PATENT DOCUMENTS

| | | | | |
|---|---|---|---|---|
| 2017/0168485 | A1* | 6/2017 | Berntorp | G05D 1/0217 |
| 2019/0354109 | A1* | 11/2019 | Pierson | G08G 3/02 |

(Continued)

OTHER PUBLICATIONS

S.S. GE and Y.J. Cui, "Dynamic Motion Planning for Mobile Robots Using Potential Field Method," Autonomous Robots, 13, pp. 207-222, 2002.

(Continued)

*Primary Examiner* — Peter D Nolan
*Assistant Examiner* — Kenneth M Dunne
(74) *Attorney, Agent, or Firm* — Quinn IP Law

(57) ABSTRACT

A method of path planning for a host vehicle includes: receiving host vehicle, environmental and obstacle information; calculating one or more projected host vehicle locations; computing a projected obstacle location for each obstacle; and determining a collision potential between each projected host vehicle location and each projected obstacle location. Until a maximum number of steps is reached, and while at least one projected host vehicle location has an associated collision potential below a collision threshold, the method further includes repeating the calculating, computing and determining steps.

20 Claims, 5 Drawing Sheets

(56) References Cited

U.S. PATENT DOCUMENTS

| | | | |
|---|---|---|---|
| 2020/0241541 A1* | 7/2020 | McCawley | B60W 30/16 |
| 2021/0020045 A1* | 1/2021 | Huang | G05D 1/021 |
| 2022/0107646 A1* | 4/2022 | Blake | B60W 60/0027 |
| 2022/0135029 A1* | 5/2022 | Poubel Orenstein | |
| | | | B60W 30/0956 |
| | | | 701/301 |

OTHER PUBLICATIONS

L. Yin, Y. Yin and C.-J. Lin, "A new potential field method for mobile robot path planning in the dynamic environments," Asian Journal of Control, 11(2), pp. 214-225, Mar. 2009.

H. Adeli, M.H.N. Tabrizi, A. Mazloomian, E. Hajipour and M. Jahed, "Path planning for mobile robots using iterative artificial potential field method" International Journal of Computer Science, 8(4), pp. 28-32, Jul. 2011.

J. Ziegler and C. Stiller, "Spatiotemporal state lattices for fast trajectory planning in dynamic on-road driving scenarios," 2009 IEEE/RSJ International Conference on Intelligent Robots and Systems, pp. 1879-1884, 2009.

T. Gu, J. Snider, J.M. Dolan and J.-W. Lee, "Focused Trajectory Planning for Autonomous On-Road Driving," IEEE Intelligent Vehicle Symposium, 6 pages, 2013.

L. Ma, J. Yang and M. Zhang, "A Two-level Path Planning Method for On-road Autonomous Driving," 2012 International Conference on Intelligent Systems Design and Engineering Application, pp. 661-664, 2012.

Y. Kuwata, J. Teo, G. Fiore, S. Karaman, E. Frazzoli, J.P. How, "Real-Time Motion Planning With Applications to Autonomous Urban Driving," IEEE Transactions on Control Systems Technology, 17(5), pp. 1105-1118, Sep. 2009.

R. Jafari, S. Xeng, N. Moshchuk and B. Litkouhi, "Reactive Path Planning for Emergency Steering Maneuvers on Highway Roads" 2017 American Control Conference, pp. 2943-2949, 2017.

E.W. Dijkstra, "A note on two problems in connexion with graphs," Numerische Mathematik, pp. 269-271, 1959.

Nagatani, K., Iwai, Y., & Tanaka, Y., "Sensor Based Navigation for car-like mobile robots using Generalized Voronoi Graph", In Proceedings 2001 IEEE/RSJ International Conference on Intelligent Robots and Systems, Expanding the Societal Role of Robotics in the Next Millennium (Cat. No. 01CH37180) (vol. 2, pp. 1017-1022) IEEE, Oct. 2001.

* cited by examiner

SYSTEM, METHOD AND CONTROLLER FOR GRAPH-BASED PATH PLANNING FOR A HOST VEHICLE

INTRODUCTION

This disclosure relates generally to graph-based path planning for host vehicles, and more particularly to systems, methods and controllers for graph-based path planning for host vehicles.

Autonomous and semi-autonomous vehicles (such as drones, robots and automotive vehicles) may be guided along paths or trajectories by various methods. One such method is known as graph-based path planning. In this method, the current and possible future locations of the vehicle are determined for a short timeframe, such as for the next 0.5 to 5 seconds. The method uses an approach similar to plotting out the locations on a graph or grid, where the environment—such as roads, lanes, airspace, other vehicles or obstacles, etc.—are also represented on the graph or grid. This approach may be carried out by on-board systems or controllers, or by off-board systems to which the vehicle has wireless or other remote access, and the determination of possible future locations for the vehicle may be used to help guide the vehicle.

However, the customary graph-based approach may determine many more possible future vehicle locations than are needed. Because the determination of these possible locations is very calculation-intensive, and because the calculations must be updated very quickly for each upcoming timeframe on an ongoing basis, it would be desirable to provide a graph-based approach which intelligently minimizes the number of possible future vehicle locations calculated while maintaining a high level of reliability and confidence.

SUMMARY

According to one embodiment, a method of path planning for a host vehicle includes: (i) receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle; (ii) calculating one or more projected host vehicle locations $L_i$ using $L_i = f_{k1}(i, L_{HV}, H_{HV}, H_{DEV}, S_{HV}, S_{DEV}, T_H, E, G)$, where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal; (iii) computing a respective projected obstacle location $O_i$ for each obstacle using $O_i = f_{k2}(i, L_{VO}, H_{VO}, S_{VO}, T_H, E)$, where $f_{k2}$ is a second kinematic function for generating the respective projected obstacle location $O_i$ for each obstacle; (iv) determining a respective collision potential between each projected host vehicle location $L_i$ and each projected obstacle location $O_i$, wherein each collision potential is associated with a respective projected host vehicle location $L_i$; and (v) until a predetermined maximum number of steps $i_{max}$ is reached, and while at least one projected host vehicle location $L_i$ is a qualified projected host vehicle location $L_i$ defined as a projected host vehicle location $L_i$ in which each of its associated collision potentials is below a collision threshold, repeating the steps of: (a) incrementing the step number i; (b) repeating the calculating step for each respective qualified projected host vehicle location $L_i$ to generate one or more additional projected host vehicle locations $L_i$ where the respective qualified projected host vehicle location is used for $L_{HV}$, (c) repeating the computing step to generate an additional projected obstacle location $O_i$ for each respective obstacle where the current projected obstacle location for each respective obstacle is used for $L_{VO}$, and (d) repeating the determining step between each additional projected host vehicle location $L_i$ and each additional projected obstacle location $O_i$.

The method may further include the step of ignoring duplicate projected host vehicle locations $L_i$, and may also or alternatively include the step of selecting an optimum sequence from the host vehicle location $L_{HV}$ through one or more of the qualified projected host vehicle locations based on minimizing an aggregate collision potential using a Dijkstra algorithm. Additionally or alternatively, the method may also further include (as part of the calculating step) the step of adjusting the host vehicle speed $S_{HV}$ by up to $S_{DEV}$ at each of the one or more projected host vehicle locations according to one or more predetermined velocity profiles (wherein each of the predetermined velocity profiles may be one or more of an acceleration profile, a deceleration profile, a constant speed profile, a coasting profile, a regenerative braking profile, an emergency acceleration profile and emergency stop profile)

The collision potential may be defined by the expression $CP = 1 - \{1/[1 + e^{\hat{}} - (d - D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance. At least one correction factor relating to environmental information E may be applied to the respective predetermined safe threshold distance $D_{SAFE}$.

In this method, the respective obstacle speed $S_{VO}$ and obstacle heading $H_{VO}$ for each obstacle may be maintained for all steps, and the predetermined radius may be a predetermined span of zones about the host vehicle. Additionally, each obstacle may be a neighboring vehicle or object. The environmental information E may include one or more of: number and arrangement of lanes and shoulders; traffic flow direction for each lane and shoulder; road surface type of each lane and shoulder; location, message/command and effective area of traffic signs/traffic signals; speed limits; local weather conditions; and proximity, speed and heading of each obstacle. Also, the goal G may include one or more of: going straight, turning left, turning right, accelerating, decelerating, maintaining a current speed, maintaining a vehicle speed at or above a minimum safe speed, maintaining the vehicle speed at or below a maximum safe speed, maintaining a minimum following distance or more behind another vehicle, merging into an adjacent lane, passing another vehicle, avoiding a passing lane when not passing, avoiding one or both shoulders, stopping at a designated location, and taking evasive action to avoid obstacles.

According to another embodiment, a method of graph-based path planning for a host vehicle, includes: (i) receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle; (ii) calculating one or more projected host vehicle locations $L_i$ using $L_i = f_{k1}(i, L_{HV}, H_{HV}, H_{DEV}, S_{HV}, S_{DEV}, T_H, E, G)$, where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal; (iii) computing a respective projected obstacle location $O_i$ for each obstacle using $O_i=f_{k2}$ (i, $L_{VO}$, $H_{VO}$, $S_{VO}$, $T_H$, E), where $f_{k2}$ is a second kinematic function for generating the respective projected obstacle location $O_i$ for each obstacle; (iv) determining a respective collision potential between each projected host vehicle location $L_i$ and each projected obstacle location $O_i$, wherein each collision potential is associated with a respective projected host vehicle location $L_i$ and wherein the collision potential is defined by $CP=1-\{1/[1+e^\wedge-(d-D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance; and (v) until a predetermined maximum number of steps $i_{max}$ is reached, and while at least one projected host vehicle location $L_i$ is a qualified projected host vehicle location $L_i$ defined as a projected host vehicle location $L_i$ in which each of its associated collision potentials is below a collision threshold, repeating the steps of: (a) incrementing the step number i; (b) repeating the calculating step for each respective qualified projected host vehicle location $L_i$ to generate one or more additional projected host vehicle locations $L_i$ where the respective qualified projected host vehicle location is used for $L_{HV}$, (c) repeating the computing step to generate an additional projected obstacle location $O_i$ for each respective obstacle where the current projected obstacle location for each respective obstacle is used for $L_{VO}$, and (d) repeating the determining step between each additional projected host vehicle location $L_i$ and each additional projected obstacle location $O_i$.

This method may further include the step of ignoring duplicate projected host vehicle locations $L_i$, and may also or alternatively include the step of selecting an optimum sequence from the host vehicle location $L_{HV}$ through one or more of the qualified projected host vehicle locations based on minimizing an aggregate collision potential using a Dijkstra algorithm. At least one correction factor relating to environmental information E may be applied to the respective predetermined safe threshold distance $D_{SAFE}$. And the method may further include (as part of the calculating step) the step of adjusting the host vehicle speed $S_{HV}$ by up to $S_{DEV}$ at each of the one or more projected host vehicle locations according to one or more predetermined velocity profiles.

According to yet another embodiment, a controller for planning a path for a host vehicle is provided, in which the controller is configured to execute the steps of: (i) receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle; (ii) calculating one or more projected host vehicle locations $L_i$ using $L_i=f_{k1}$(i, $L_{HV}$, $H_{HV}$, $H_{DEV}$, $S_{HV}$, $S_{DEV}$, $T_H$, E, G), where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal; (iii) computing a respective projected obstacle location $O_i$ for each obstacle using $O_i=f_{k2}$ (i, $L_{VO}$, $H_{VO}$, $S_{VO}$, $T_H$, E), where $f_{k2}$ is a second kinematic function for generating the respective projected obstacle location $O_i$ for each obstacle; (iv) determining a respective collision potential between each projected host vehicle location $L_i$ and each projected obstacle location $O_i$, wherein each collision potential is associated with a respective projected host vehicle location $L_i$; and (v) until a predetermined maximum number of steps $i_{max}$ is reached, and while at least one projected host vehicle location $L_i$ is a qualified projected host vehicle location $L_i$ defined as a projected host vehicle location $L_i$ in which each of its associated collision potentials is below a collision threshold, repeating the steps of: (a) incrementing the step number i; (b) repeating the calculating step for each respective qualified projected host vehicle location $L_i$ to generate one or more additional projected host vehicle locations $L_i$ where the respective qualified projected host vehicle location is used for $L_{HV}$, (c) repeating the computing step to generate an additional projected obstacle location $O_i$ for each respective obstacle where the current projected obstacle location for each respective obstacle is used for $L_{VO}$, and (d) repeating the determining step between each additional projected host vehicle location $L_i$ and each additional projected obstacle location $O_i$.

In the configuration of the controller, the collision potential may be defined by the expression $CP=1-\{1/[1+e^\wedge-(d-D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance. The controller may be further configured to execute the step of selecting an optimum sequence from the host vehicle location $L_{HV}$ through one or more of the qualified projected host vehicle locations based on minimizing an aggregate collision potential using a Dijkstra algorithm. Additionally, the controller may be configured to execute (as part of the calculating step) the step of adjusting the host vehicle speed $S_{HV}$ up to $S_{DEV}$ at each of the one or more projected host vehicle locations according to one or more predetermined velocity profiles.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
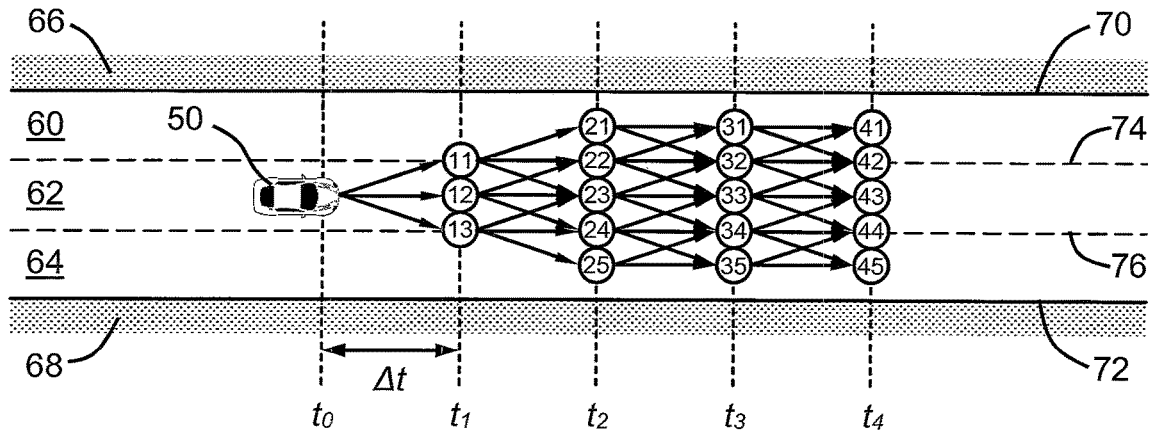
FIG. 1 is a schematic plan view of a host vehicle on a highway showing the determination of possible future vehicle locations according to a customary approach.

Referring now to the drawings, wherein like numerals indicate like parts in the several views, a system/controller 100 for graph-based path planning for a host vehicle 50, and a method 200 for graph-based path planning for a host vehicle 50, are shown and described herein. Note that the reference indicators $H_{HV}$, $S_{HV}$ and $L_{HV}$ in the drawings and specification have the subscript "HV", which stands for "host vehicle" 50, while the indicators $H_{VO}$, $S_{VO}$ and $L_{VO}$ have the subscript "VO", which stands for "(other) vehicle/object" 51, 52, 53. Further, the "H", "S" and "L" in these indicators stand for an initial "heading", initial "speed" or initial "location", respectively. Also note that the terms "node" and "location" are used interchangeably herein, as each refers to a position or location of a vehicle or object (e.g., on a road surface). Nodes or locations relating to the host vehicle 50 are represented in the drawings by a circle, while nodes or locations of a first, second or third other vehicle/object 51, 52, 53 are represented by a triangle, cross or square, respectively. For purposes of illustration, the first other vehicle/object 51 is shown as a "fast" vehicle having about the same speed as the host vehicle 50, the second other vehicle/object 52 is shown as a "stalled" vehicle, and the third other vehicle/object 53 is shown as a "slow" vehicle having a speed about half that of the host vehicle 50. Each of these other vehicles/objects 51, 52, 53 may also be referred to as an "obstacle", and herein the terms "other vehicles/objects" and "obstacles" may be used interchangeably.

FIG. 1 shows a schematic plan view of a host vehicle 50 on a highway showing the determination of possible future vehicle locations according to a customary approach. Note that while the drawings and specification focus on an automotive passenger vehicle on a highway for describing the system/controller 100 and method 200, it should be apparent that the system/controller 100 and method 200 also apply to other types of autonomous and semi-autonomous vehicles and environments, such as drones and aerial vehicles flying in an airspace, ground vehicles driving over roads or terrain, mobile robots moving across surfaces and/or through structures, surface watercraft moving across the surface of a body of water, submersible watercraft moving across the surface of a body of water or at various depths beneath the surface of the body of water, satellites or spacecraft moving through space, etc. Also note that while a straight three-lane section of highway is used in the drawings and specification, the system/controller 100 and method 200 also apply to other road and lane configurations, including intersections, converging/diverging lanes, etc.

The highway shown in the drawings has a left lane 60, a middle lane 62, a right lane 64, a left shoulder 66 and a right shoulder 68. A left lane/left shoulder border 70 separates the left lane 60 and the left shoulder 66 from each other, and a right lane/right shoulder border 72 separates the right lane 64 and the right shoulder 68 from each other. Additionally, a left/middle lane divider 74 separates the left and middle lanes 60, 62 from each other, while a right/middle lane divider 76 separates the right and middle lanes 64, 62 from each other. In the drawings, the traffic direction for all three lanes 60, 62, 64 flows from left to right.

In FIG. 1, a host vehicle 50 in the form of a passenger car is shown in the middle lane 62, heading from left to right at a given speed. A series of vertical dashed lines marked $t_0$ through $t_4$ cross the highway to indicate possible locations of the host vehicle 50 at times $t_0$ through $t_4$. For example, the vertical dashed line that passes through the host vehicle 50 indicates the location of the host vehicle 50 at an initial time $t_0$. After a predetermined time increment Δt, the host vehicle 50 will be located at the next vertical line at time $t_1$; then, after another time increment Δt, the host vehicle 50 will be at the next vertical line at time $t_2$, and so on. (Note that this assumes the host vehicle 50 is travelling at a constant speed.) Although four time increments (from $t_0$ to $t_4$) are shown in FIG. 1, any number of desired time increments may be used.

FIG. 1 also illustrates the aforementioned graph-based method of path planning, in which the possible future locations of the host vehicle 50 may be visualized as a series of interconnected nodes. If it is assumed that the host vehicle 50 may deviate its heading to the left or to the right as it travels forward, this adds additional nodes to the graph besides the nodes that represent the host vehicle merely continuing to go straight. For example, let it be assumed that the host vehicle 50 has three heading options during each time increment Δt: veer left, continue straight, or veer right. Further, let it be assumed that during each time increment Δt, the host vehicle 50 may veer left or right by one-half the lane width. This means that if the host vehicle 50 is initially in the center of the middle lane 62 at $t_0$ as shown, then there are three options for the locations or nodes where the host vehicle 50 may be at time $t_1$: on the left/middle lane divider 74, in the center of the middle lane 62, or on the right/middle lane divider 76. These three possible locations are represented by the three circles at $t_1$ labeled 11, 12 and 13. These two-digit labels follow a convention used throughout the present disclosure for labelling nodes, where the first digit represents the time (e.g., a "1" corresponds to $t_1$, a "2" corresponds to $t_2$, etc.), and the second digit is a unique identifier for each node associated with the time (e.g., "1", "2" and "3" represent the first, second and third nodes, respectively, for the given time).

During the next time increment Δt in going from $t_1$ to $t_2$, if the same assumptions are maintained, then proceeding from each node 11, 12, 13 the host vehicle 50 will have three further possible locations. For example, from node 11, the host vehicle 50 may proceed leftward to node 21, straight to node 22, or rightward to node 23, as indicated by the arrows proceeding from node 11. Similarly, from node 12, the host vehicle 50 may proceed to node 22, 23 or 24, and from node 13 the host vehicle 50 may proceed to node 23, 24 or 25.

For the next time increment Δt in going from $t_2$ to $t_3$, note that nodes 21 and 25 only have two downstream nodes each rather than three. (As used herein, "upstream" and "downstream" nodes are those which are to the left or to the right, respectively, from a given node, as viewed in the drawings and as indicated by the arrows connecting the nodes.) This is because of a constraint that may be applied to the graph-based method which dictates that the nodes may not be expanded outside of the highway—that is, onto either shoulder 66, 68. (However, this constraint could be overridden for certain situations, such as when a sudden evasive maneuver onto a shoulder 66, 68 is needed to avoid a collision.) Thus, for time $t_3$, five nodes or possible future locations for the host vehicle 50 are shown: nodes 31, 32, 33, 34 and 35. This constraint would continue in force (unless or until overridden) for each subsequent time interval Δt, as shown for time $t_4$ and nodes 41, 42, 43, 44 and 45, and so on. What results is a network of interconnected nodes or potential future locations, which represents a number of possible paths which the host vehicle 50 could take.

However, note that the customary approach shown in FIG. 1 produces many duplicated nodes for each time interval Δt. For example, from time $t_1$ to $t_2$, node 22 is downstream of and determined from nodes 11 and 12, as indicated by the two arrows pointing to node 22. Similarly, node 23 is downstream of and determined from nodes 11, 12 and 13, as indicated by the three arrows pointing to node 23. In other words, some nodes may be determined or calculated from multiple sources, which represents a duplication of effort and therefore a waste of processing power and time.

Further, even if the customary approach were made to avoid duplications, it may still determine many potential paths for the host vehicle 50 which turn out to be impractical or impossible because of impediments and obstacles that interfere with some of the potential paths.

In contrast, the system/controller 100 and method 200 of the present disclosure uses information about other vehicles/objects, as well as environmental information, to selectively determine future possible locations of the host vehicle 50 in a way that avoids many of the abovementioned duplications, as well as avoiding potential paths that may be interfered with by other vehicles or obstacles or which may pose an undesirable risk. One way in which the system/controller 100 and method 200 of the present disclosure solves the aforementioned technical problems is by the technical effect of only considering a limited number of potential projected paths for the host vehicle 50, rather than the conventional approach of determining and/or considering all possible paths for the host vehicle 50, and selecting an optimum path based on predetermined criteria, such as minimizing risk according to a cost function. This provides a significant technical advantage over other approaches.

Figure 2:
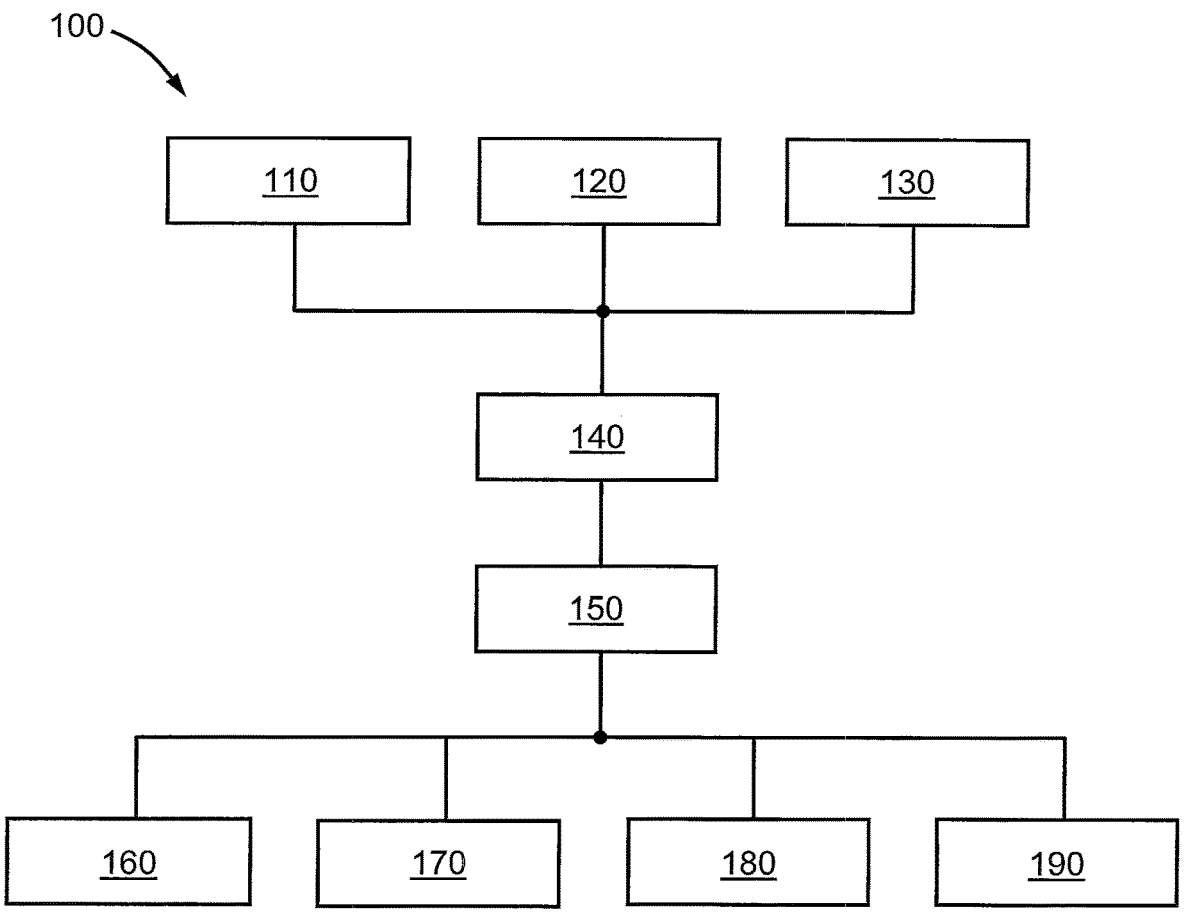
FIG. 2 is a block diagram of a system and controller according to the present disclosure.

FIG. 2 shows a block diagram of a system/controller 100 according to the present disclosure. The system/controller 100 may include all of the blocks or modules shown, or it may include a subset of all these blocks or modules. For example, one configuration of the system/controller 100 may include just a decider module 140, another configuration may include the decider module 140 and a vehicle controller 150, and yet another configuration may include the decider module 140, the vehicle controller module 150 and one or more of a sensor-related module 110, an ECU-related module 120 and an environment/map information-related module 130. Each of these modules may be implemented in hardware, software and/or firmware form, with two or more of the modules being integrated together (e.g., as part of a single hardware unit) and one or more other modules being implemented separately. In any such configuration, the system/controller 100 includes at least the decider module 140, which includes instructions for planning a path for the host vehicle 50, and the modules making up the system/controller 100 are operatively connected with one another and also operatively connected with other modules and input sources that are not part of the system/controller 100.

The sensor-related module 110 may include a plurality of sensors (e.g., RADAR, LIDAR, ultrasonic, optical, temperature, etc.) capable of sensing information about the environment and obstacles outside of and within a certain range of the host vehicle 50 (e.g., about weather conditions, other vehicles or objects, etc.) or pertaining to the host vehicle 50 itself (e.g., the host vehicle's heading, speed, etc.), and/or the senor-related module 110 may include information/data signals obtained from such sensors. The ECU-related module 120 may include a host vehicle's ECU (engine control unit) control module, and/or information/data signals obtained from the ECU, such as the host vehicle's speed, acceleration, heading, throttle position, gear range, etc. The environment/map information-related module 130 may include a hardware module capable of obtaining information (e.g., wirelessly) about the environment outside of and within a certain range of the host vehicle 50 (e.g., regarding weather conditions, broadcasted notices and warnings, and the locations, speeds and headings of nearby vehicles and objects), and/or the environment/map information-related module 130 may include information/data signals obtained from such a hardware module. Note that some information, such as the host vehicle's speed, another vehicle's location or weather conditions, may be sensed or provided by more than one of these modules 110, 120, 130. The information provided by these modules 110, 120, 130 is used by the decider module 140 to execute a graph-based path planning method 200 (described in more detail below), with the decider module 140 determining a desired sequence of upcoming locations for the host vehicle 50 and sending this information to the vehicle control module 150. The vehicle control module 150 then sends appropriate signals to the steering subsystem/module 160, the throttle subsystem/module 170, the braking subsystem/module 180 and any pertinent other subsystems/modules 190 (e.g., controlling the headlights, signal lights, etc.) in order to follow the selected sequence of nodes.

Figure 3:
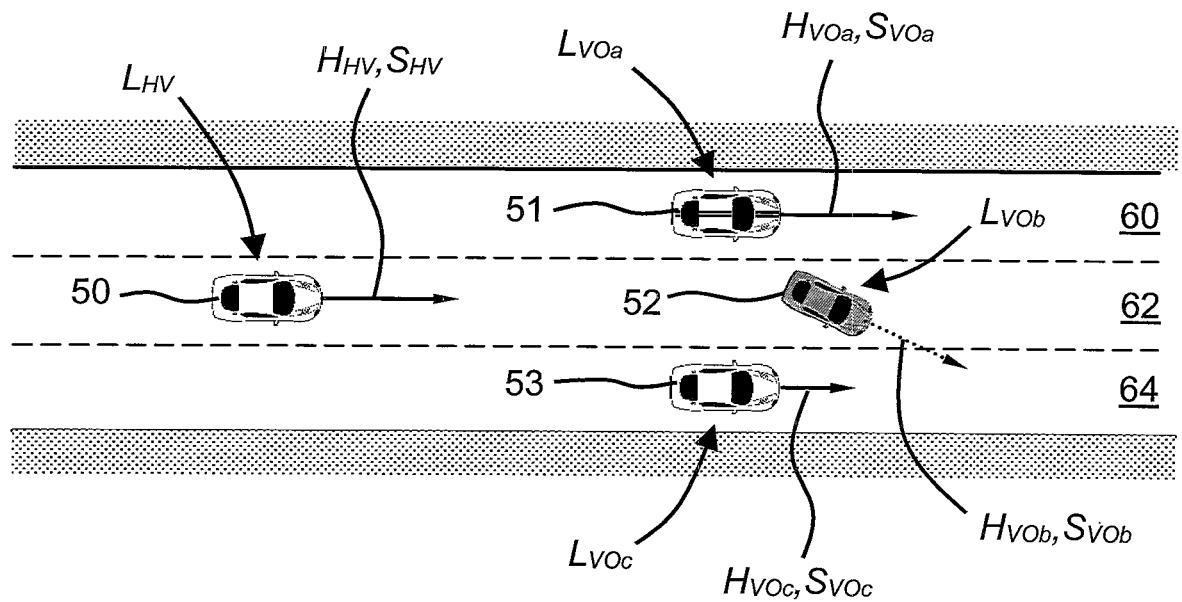
FIG. 3 is a schematic plan view of a host vehicle and other vehicles/objects on a highway, illustrating the initial locations, headings and speeds thereof.

FIG. 3 shows a schematic plan view of a host vehicle 50 and other representative vehicles/objects 51, 52, 53 on a highway, illustrating the initial locations, headings and speeds thereof at an arbitrary starting time $t_0$. At this starting time $t_0$, the host vehicle 50 has an initial location $L_{HV}$ in the middle lane 62 as shown, and an initial heading and speed $H_{HV}$, $S_{HV}$ as indicated by the associated vector arrow. At this same starting time $t_0$, the following other vehicles/objects on the highway are shown: (i) a first other vehicle/object 51, shown as a "fast" vehicle having an initial location $L_{VOa}$ in the left lane 60, and having an initial heading and speed $H_{VOa}$, $S_{VOa}$ that is about the same as that of the host vehicle 50 as indicated by the associated vector arrow; (ii) a second other vehicle/object 52, shown as a "stalled" vehicle having an initial location $L_{VOb}$ in the middle lane 62, and having an initial (and possibly indeterminate) heading $H_{VOb}$ and an initial (zero) speed $S_{VOb}$, as indicated by the dotted vector arrow; and (iii) a third other vehicle/object 53, shown as a "slow" vehicle having an initial location $L_{VOc}$ in the right lane 64, an initial heading $H_{VOc}$ about the same as that of the host vehicle 50, and an initial speed $S_{VOc}$ that is about half that of the host vehicle 50 as indicated by the associated vector arrow. Note that here and elsewhere in specification and drawings, the locations, headings and speeds of the first, second and third other vehicles/objects 51, 52, 53 may be identified by the subscripts "a", "b" and "c", respectively. For example, $L_{VOa}$, $L_{VOb}$ and $L_{VOc}$ are the initial locations of the first, second and third other vehicles/objects 51, 52, 53, respectively.

Figure 4:
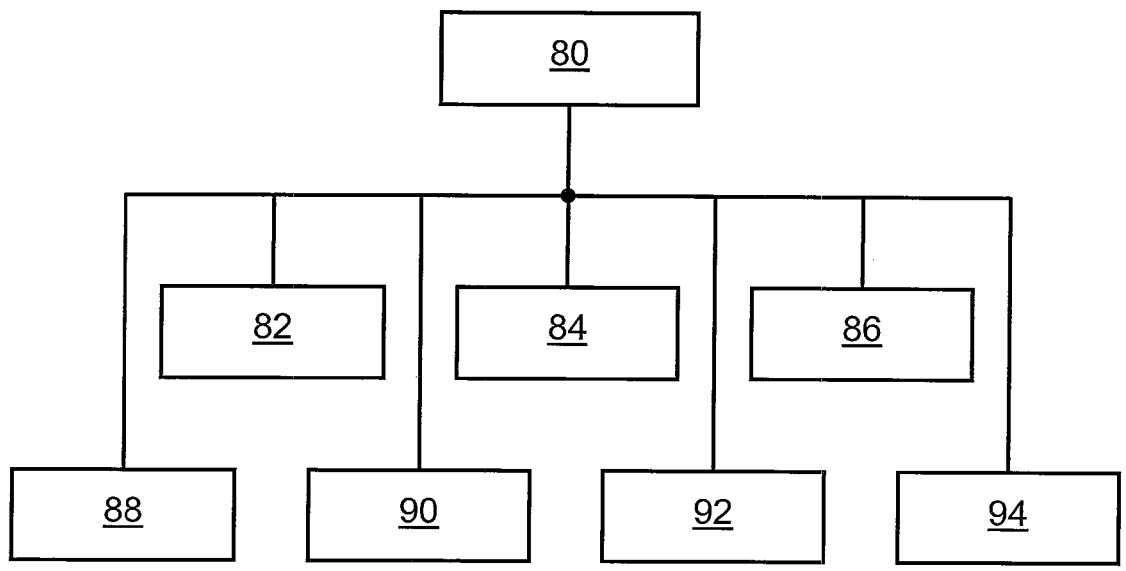
FIG. 4 is a block diagram of various velocity profiles.
Figure 5:
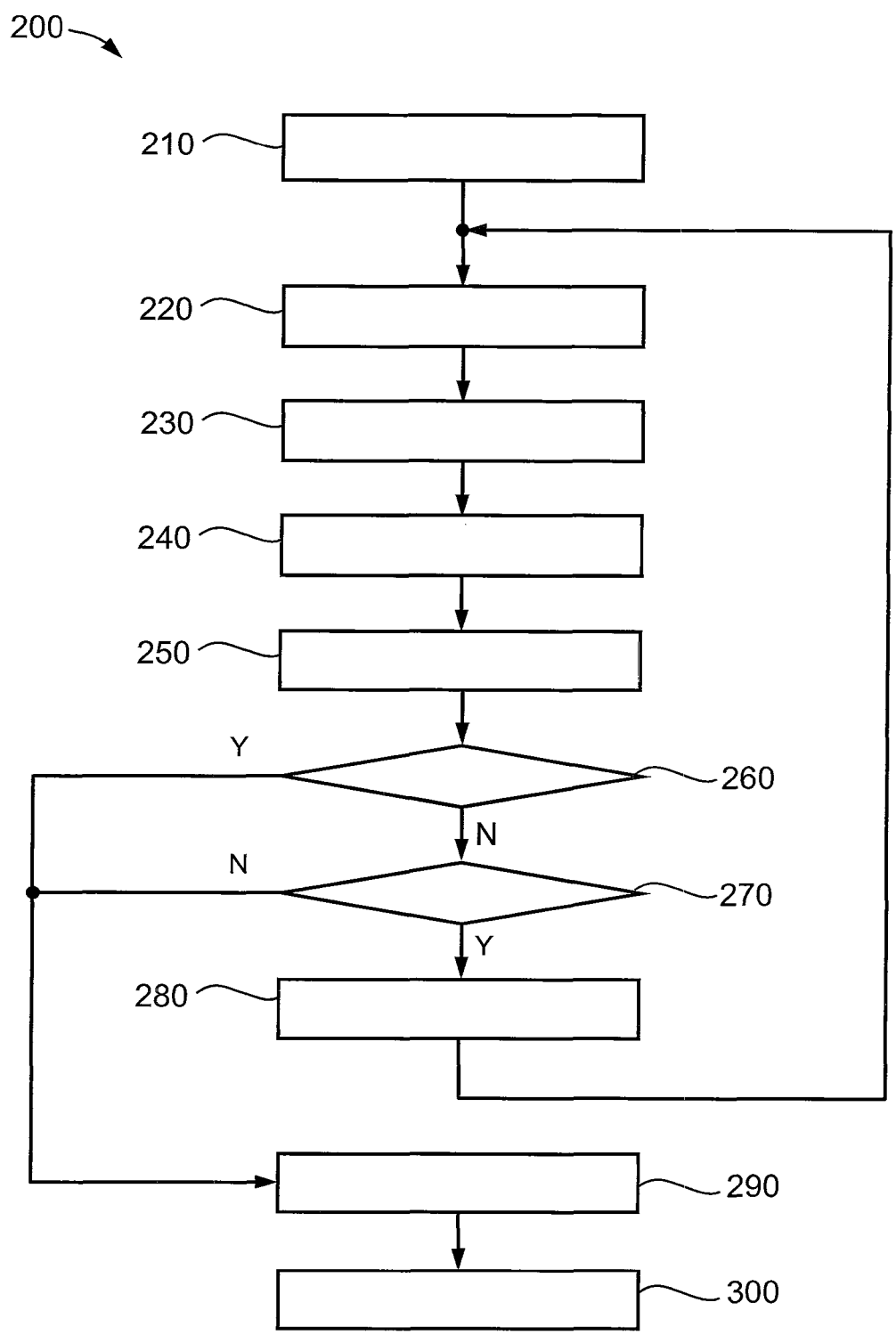
FIG. 5 is a flowchart of a method according to the present disclosure.

FIG. 5 shows a flowchart of the aforementioned method 200 of path planning for a host vehicle 50. As mentioned above, the decider module 140 of the system/controller 100 contains instructions, which when executed will carry out the steps of the method 200. The steps of the method 200 shown in FIG. 5, which the system/controller 100 is configured to execute, will now be described in detail, with additional reference to: (i) FIG. 4, which shows a block diagram of various velocity profiles 80; (ii) FIGS. 6-9, which show successive schematic plan views of the host vehicle 50 and other vehicles/objects 51, 52, 53 on a highway, showing the determination of projected host vehicle locations $L_i$ and projected other vehicle/object locations $O_i$; and (iii) FIG. 10, which shows a schematic plan view of current and projected locations of the host vehicle 50 and other vehicles/objects 51, 52, 53 on a highway, synced with successive views of the host vehicle locations $L_i$ and other vehicle/object locations $O_i$ at various selected times. (As alluded to above, the terms "other vehicle/object" and "obstacle" may be used interchangeably. Hereinafter, the term "obstacle" will primarily be used, along with the associated subscript "VO".)

Figure 6:
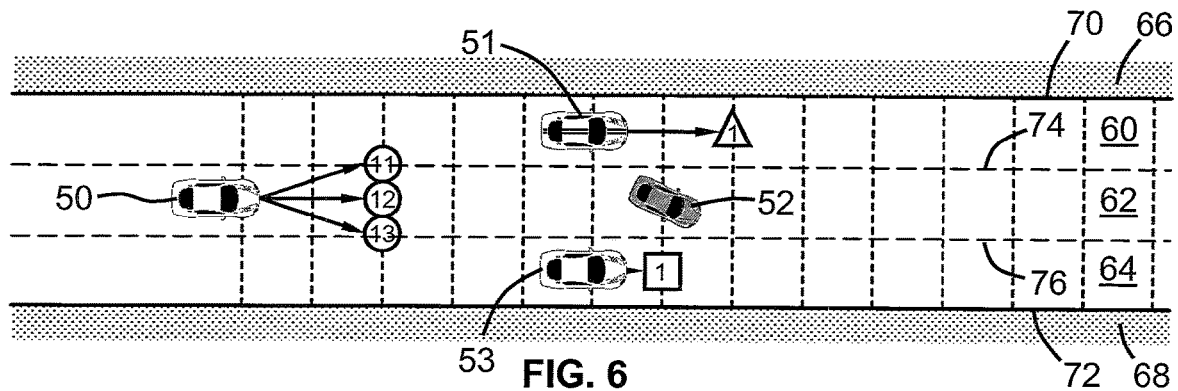
FIGS. 6-9 are successive schematic plan views of a host vehicle and other vehicles/objects on a highway, showing the determination of projected host vehicle locations and projected other vehicle/object locations.
Figure 10:
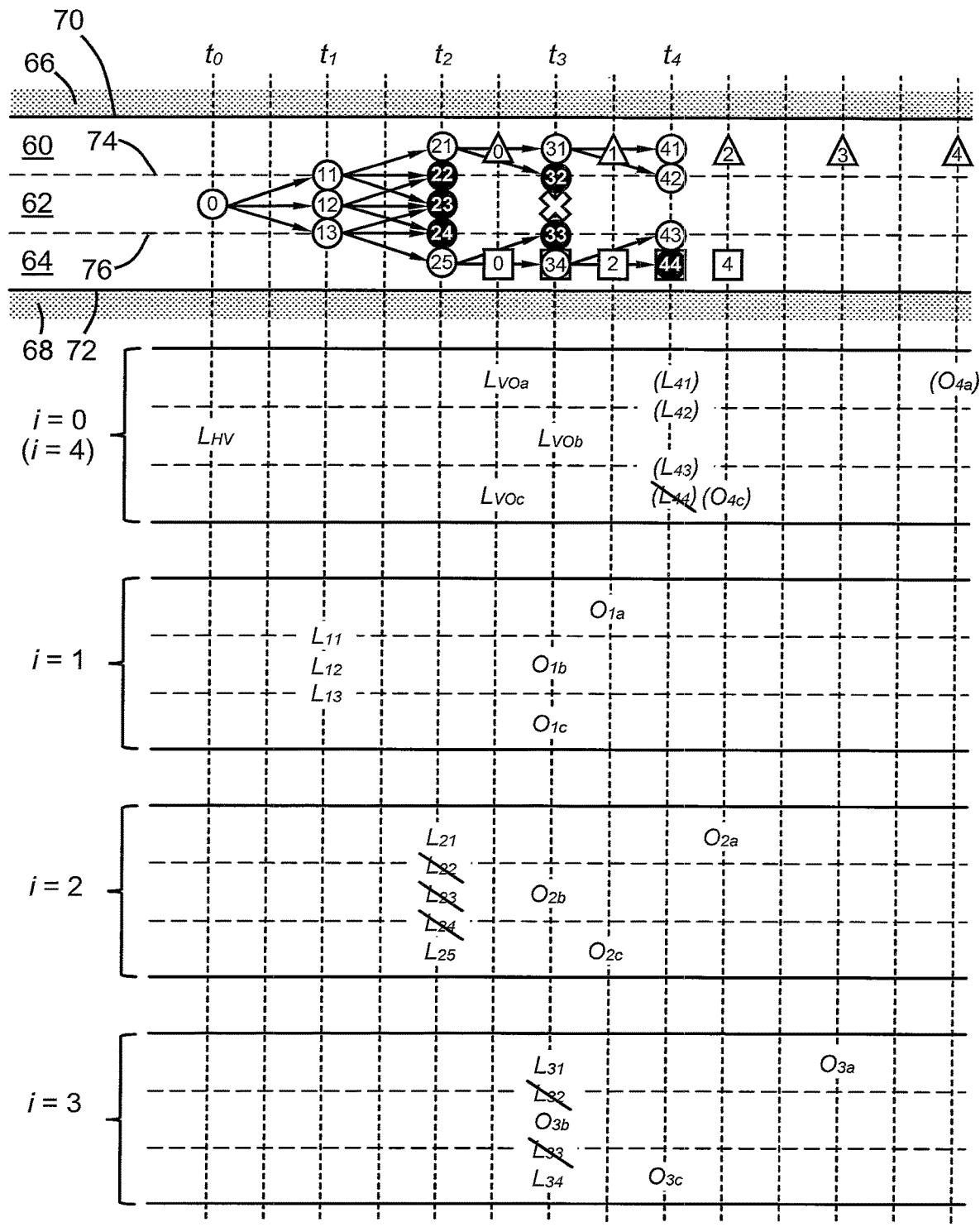
FIG. 10 is a schematic plan view of current and projected locations of a host vehicle and other vehicles/objects on a highway, synced with successive views of the host vehicle locations and other vehicle/object locations at selected times.

According to one embodiment, the method 200 includes, at block 210, a first step of receiving a host vehicle initial heading $H_{HV}$, a host vehicle initial speed $S_{HV}$, a host vehicle initial location $L_{HV}$, environmental information E, and a respective initial heading $H_{VO}$, speed $S_{VO}$ and location $L_{VO}$ for each obstacle 51, 52, 53 within a predetermined set of radii or highway zones about the host vehicle 50. (These bits of information may be received from one or more sensors or other modules.) The initial headings, speeds and locations of the host vehicle 50 and its neighboring obstacles 51, 52, 53 are shown in FIGS. 3, 6 and 10. In an exemplary explanation of this method, 200 the respective obstacle speed $S_{VOa}$, $S_{VOb}$, $S_{VOc}$ and obstacle heading $H_{VOa}$, $H_{VOb}$, $H_{VOc}$ for each obstacle 51, 52, 53 may be maintained for all steps. The environmental information E may include one or more of: number and arrangement of lanes and shoulders; traffic flow direction for each lane and shoulder; road surface type of each lane and shoulder; location, message/command and effective area of traffic signs/traffic signals; speed limits; local weather conditions; and proximity, speed and heading of each neighboring obstacle/object/other vehicle. The set of radii or zones that are considered around the host vehicle 50 may be the same for all directions (e.g., a constant radius about the host vehicle 50), or it may vary by direction (e.g., five zones ahead of the host vehicle 50, one zone to either side of the host vehicle 50, and two zones behind the host vehicle 50). Also, the set of radii or zones about the host vehicle 50 may vary depending on host vehicle speed, driving situation, weather conditions and/or other factors. As used here, a "zone" may be a dynamic or moving region of space ahead, beside or behind the moving host vehicle 50; for example, each zone may be the width of a lane and have a length of about one car length. A "neighboring" obstacle 51, 52, 53 may be another vehicle/object that is located within this set of radii or highway zones.

At block 220, one or more projected host vehicle locations $L_i$ are calculated using $L_i = f_{k1}(i, L_{HV}, H_{HV}, H_{DEV}, S_{HV}, S_{DEV}, T_H, E, G)$, where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal. $H_{DEV}$ and $S_{DEV}$ can each be positive or negative numbers. For example, a deviation in heading to the left for the host vehicle 50 may be a negative number for $H_{DEV}$ and a deviation to the right may be a positive number, and a decrease in speed for the host vehicle 50 may be a negative number for $S_{DEV}$ and an increase may be a positive number. $T_H$ is a hypothesis time step defined as a traveling time between each pair of sequentially adjacent projected host vehicle locations $L_i$. For example, $T_H$ may be some number of tenths, hundredths or thousandths of a second. The goal G may include one or more of: going straight, turning left, turning right, accelerating, decelerating, maintaining a current speed, maintaining a host vehicle speed at or above a minimum safe speed, maintaining the host vehicle speed at or below a maximum safe speed, maintaining a minimum following distance or more behind another vehicle, merging into an adjacent lane, passing another vehicle, avoiding a passing lane when not passing, avoiding one or both shoulders, stopping at a designated location, and taking evasive action to avoid obstacles. The goal G may be predeterminedly associated with one or more factors, such as the environmental information E. (That is, the goal G may be associated with one or more factors in a predetermined manner.)

At block 230, the method 200 may optionally include the step of ignoring duplicate projected host vehicle locations $L_i$.

At block 240, a respective projected obstacle location $O_i$ is computed for each obstacle using $O_i = f_{k2}(i, L_{VO}, H_{VO}, S_{VO}, T_H, E)$, where $f_{k2}$ is a second kinematic function for generating the respective projected obstacle location $O_i$ for each obstacle 51, 52, 53.

FIG. 6 shows the initial locations and headings (at time $t_0$) of the host vehicle 50 and the first, second and third obstacles 51, 52, 53, represented as "car" icons on a three-lane highway. FIG. 6 also shows the next projected host vehicle locations $L_i$, represented as three circles labelled "11", "12" and "13", and the next projected obstacle location $O_i$ for the first, second and third obstacles 51, 52, 53, after a time increment $\Delta t$ (i.e., at time $t_1$). The projected obstacle location $O_i$ for the first obstacle (or "fast vehicle") 51 is represented by a triangle labeled with a "1", and the projected obstacle location $O_i$ for the third obstacle (or "slow vehicle") 53 is represented by a square labeled with a "1". No projected obstacle location $O_i$ is shown for the second obstacle (or "stalled vehicle") 52 because it is not moving; thus, it maintains the same location $L_{VOb}$ throughout FIGS. 6-10. Thus, FIG. 6 shows that after the first time increment $\Delta t$, the host vehicle 50 may move to either of the three nodes represented by the three circles, the first obstacle/fast vehicle 51 will move to the node represented by the triangle, the second obstacle/stalled vehicle 52 will not move, and the third obstacle/slow vehicle 53 will move to the node represented by the square.

At block 250, a respective collision potential CP is determined between each projected host vehicle location $L_i$ and each projected obstacle location $O_i$, wherein each collision potential CP is associated with a respective projected host vehicle location $L_i$. Thus, in FIG. 6, nine different collision potentials CP will be determined: (i) between the "11" circle location and the "1" triangle location, (ii) between the "11" circle location and the stalled vehicle location, (iii) between the "11" circle location and the "1" square location, (iv) between the "12" circle location and the "1" triangle location, (v) between the "12" circle location and the stalled vehicle location, (vi) between the "12" circle location and the "1" square location, (vii) between the "13" circle location and the "1" triangle location, (viii) between the "13" circle location and the stalled vehicle location, (ix) between the "13" circle location and the "1" square location.

The collision potential CP may be defined by a cost function, such as the expression $CP = 1 - \{1/[1+e^{-(d-D_{SAFE}/2)}]\}$, where CP is the collision potential, d is a respective distance between each projected host vehicle location $L_i$ and each projected obstacle location $O_i$, and $D_{SAFE}$ is a respective predetermined safe threshold distance. For example, each of the nine distances listed in the previous paragraph between each projected host vehicle location $L_i$ and each projected obstacle location $O_i$ would be used as the distance d in the CP equation to determine the respective collision potential CP between each respective pair of projected locations $L_i$, $O_i$. Note that $D_{SAFE}$ may vary depending upon the proximity and/or angular orientation between the projected host vehicle location $L_i$ the projected obstacle location $O_i$. For example, a vehicle in a lane beside the host vehicle 50 may have a smaller $D_{SAFE}$ (e.g., 3 feet) than a vehicle in front of the host vehicle 50 (e.g., 60 feet), because the former vehicle poses less risk than the latter vehicle. At least one correction factor relating to environmental information E (e.g., weather conditions, proximity to and headings of other vehicles/objects, etc.) may be applied to the respective predetermined safe threshold distance $D_{SAFE}$. Thus, $D_{SAFE}$ may be a set of different safe threshold distances which depend on various factors, such as host vehicle speed, other vehicle/object speed, road conditions, environmental factors, etc.

At block 260, a check or decision is made as to whether a predetermined maximum number of steps $i_{max}$ has been reached. If it has been reached, the method 200 proceeds to block 290, but if it has not been reached the method 200 proceeds to block 270. The maximum number of steps $i_{max}$ may be defined as a predetermined or dynamically determined number of time increments $\Delta t$ (e.g., totaling 4-7 seconds), or it may vary depending on various factors, such as host vehicle speed, other vehicle/object speed, road structure, weather conditions, etc.

At block 270, a check or decision is made as to whether at least one projected host vehicle location $L_i$ is a "qualified" projected host vehicle location $L_i$, which is defined as a projected host vehicle location $L_i$ in which each of its associated collision potentials CP is below a collision threshold $CP_{threshold}$. If at least one projected host vehicle location $L_i$ is a qualified projected host vehicle location $L_i$, the method 200 proceeds to block 280, but if not then the method 200 proceeds to block 290. Like $D_{SAFE}$, $i_{max}$ and other quantities used in the calculations, the collision threshold $CP_{threshold}$ may also vary depending upon various factors and conditions; or, it may be a fixed value. Since the collision potential CP varies from 0 to 1, the collision threshold $CP_{threshold}$ will likewise be between 0 and 1 (e.g., 0.5, again possibly depending on various factors and conditions).

At block 280, the predetermined maximum number of steps $i_{max}$ has not yet been reached, and at least one projected host vehicle location $L_i$ is a qualified projected host vehicle location $L_i$, so certain variables are reset and certain steps are repeated, until the predetermined maximum number of steps $i_{max}$ has been reached and/or none of the projected host vehicle locations $L_i$ is a qualified projected host vehicle location $L_i$. In block 280: (a) the step number i is incremented; (b) the calculating step of block 220 is repeated for each respective qualified projected host vehicle location $L_i$ in order to generate one or more additional projected host vehicle locations $L_i$, where the respective qualified projected host vehicle location is used (substituted in) for $L_{HV}$; (c) the computing step of block 240 is repeated to generate an additional projected obstacle location $O_i$ for each respective obstacle where the current projected obstacle location for each respective obstacle is used (substituted in) for $L_{VO}$; and (d) the determining step of block 250 is repeated between each additional projected host vehicle location $L_i$ and each additional projected obstacle location $O_i$. Optionally, the step of ignoring duplicate projected host vehicle locations $L_i$ at block 230 may also be included between the repeated steps of blocks 220 and 240. The steps of blocks 220, 240 and 250 (and optionally block 230) are further repeated, until the predetermined maximum number of steps $i_{max}$ has been reached and/or none of the projected host vehicle locations $L_i$ is a qualified projected host vehicle location $L_i$.

At block 290, the method 200 may further include the step of selecting an optimum sequence from the host vehicle location $L_{HV}$ through one or more of the qualified projected host vehicle locations $L_i$, based on minimizing an aggregate collision potential CP using a Dijkstra algorithm. Additionally or alternatively, the method 200 may also further include (as part of the calculating step at block 220) the step of adjusting the host vehicle speed $S_{HV}$ by an amount of up to $S_{DEV}$ at each of the one or more projected host vehicle locations $L_i$ according to one or more predetermined velocity profiles 80. As represented in the block diagram of FIG. 4, each of the predetermined velocity profiles 80 may be one or more of an acceleration profile 82, a deceleration profile 84, a constant speed profile 86, a coasting profile 88, a regenerative braking profile 90, an emergency acceleration profile 92 and emergency stop profile 94. After an optimum sequence of qualified projected host vehicle locations $L_i$ is selected, the method 200 flows to block 300 where the method 200 ends.

The method 200 will now be further explained by way of example, using the exemplary arrangement shown in FIGS. 6-10. FIGS. 6-9 show successive iterations of the method 200 at times $t_1$ through $t_4$, respectively, and FIG. 10 shows the host vehicle 50, the obstacles 51, 52, 53 and all of the projected locations $L_i$, $O_i$ for times $t_0$ through $t_4$ all on one graph or plot, synced with successive views of the projected locations $L_i$, $O_i$ at times $t_0$ through $t_4$. (Note that the projected locations $L_i$, $O_i$ for times $t_0$ and $t_4$ are plotted together on the same graph.) In FIGS. 6-9, the host vehicle 50 appears as a car icon in the same location on each drawing, but this is done to avoid the clutter of drawing the host vehicle's car icon repeatedly at the projected host vehicle locations on the graphs. Instead, the labeled circles are used to represent the various current and/or projected host vehicle locations.

The steps of calculating one or more projected host vehicle locations $L_i$ (block 220), computing projected obstacle locations $O_i$ (block 240), and determining collision potentials CP between each newly projected host vehicle location $L_i$ and each newly projected obstacle location $O_i$ (block 250) are described above with reference to FIG. 6, in going from an initial time to $t_0$ the next time instance $t_1$. If the predetermined maximum number of steps $i_{max}$ has not yet been reached, and at least one of the one or more projected host vehicle locations $L_i$ is a qualified projected host vehicle location $L_i$, then the method 200 proceeds on to the situation illustrated in FIG. 7.

Figure 7:
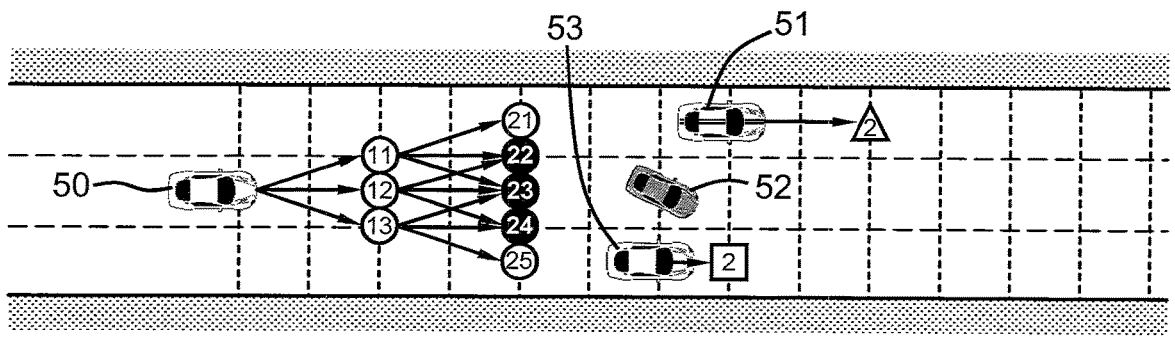

In FIG. 7, the first and third vehicles 51, 53 are shown as having moved to the respective locations that were projected in FIG. 6. That is, in FIG. 6 the "fast" vehicle 51 has a projected next location shown as a triangle labeled with a "1" and the "slow" vehicle 53 has a projected next location shown as a square labeled with a "1", but in FIG. 7 the car icons for these vehicles 51, 53 have moved to the locations that were previously projected in FIG. 6. This same process is repeated in going from FIG. 7 to FIG. 8, and from FIG. 8 to FIG. 9. The second vehicle 52 remains in the same location in all the drawings because it is a stalled (non-moving) vehicle. In each of FIGS. 6-9, the first and third vehicles 51, 53 are each shown in two ways: as a car icon (representing the current location in each drawing) and also as an associated triangle or square icon (representing the projected next location). In contrast, in each of FIGS. 6-9, the host vehicle 50 is shown as a car icon in the same location in all the drawings (to avoid clutter, as explained above), along with all of the accumulated host vehicle locations that have been projected up through each time $t_1$-$t_4$, respectively.

As described above, in going from $t_0$ to $t_1$ in FIG. 6, three projected host vehicle locations (i.e., the circles labeled "11", "12" and "13" have been determined from the initial host vehicle location $L_{HV}$. In going from $t_1$ to $t_2$ in FIG. 7, a respective set of three projected host locations are determined for each of the three then-current locations 11, 12, 13.

For example, from "circle 11" (i.e., the node or location represented as a circle labeled "11"), nodes 21, 22 and 23 are determined, as indicated by the three arrows proceeding from circle 11. From "circle 12", another set of three nodes 22, 23 and 24 are determined, and from "circle 13", yet another set of three nodes 23, 24, 25 are determined. Note that some of these nodes or projected locations are determined by two or more previous or upstream nodes. For example, node 22 is determined from upstream nodes 11 and 12, node 23 is determined from upstream nodes 11, 12 and 13, and node 24 is determined from upstream nodes 12 and 13. When any calculated or determined node is a duplication of a previously determined node, one of the nodes may be ignored and the other node may be retained.

Note that FIG. 7 shows nodes 22, 23 and 24 as solid black circles. This is done to identify these three nodes as failing to be "qualified" projected host vehicle locations, meaning that each of these nodes 22, 23, 24 has at least collision potential CP that is below at or above the pertinent collision threshold $CP_{threshold}$. From FIG. 7, it is apparent that these three nodes 22, 23, 24 fail to be deemed as "qualified" because of their proximity to the stalled vehicle 52. Thus, if the host vehicle 50 were to pursue a route involving any of these three nodes 22, 23, 24, the route would assume an unacceptable level of risk due to the high collision potential CP of the involved node(s) 22, 23, 24. Therefore, the method 200 would skip these "risky" nodes, and would only determine next projected host vehicle locations from the less risky "qualified" nodes, which in this case would be nodes 21 and 25.

Figure 8:
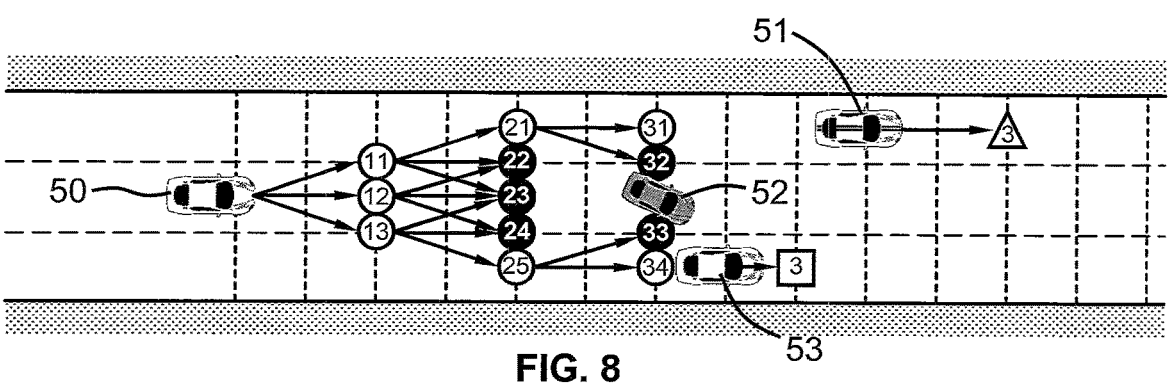

In FIG. 8, which goes from $t_2$ to $t_3$, the three "risky" nodes 22, 23, 24 are not considered (i.e., skipped with regard to the method 200), and projected nodes are only determined from the two "qualified" nodes 21 and 25, resulting in newly projected nodes 31, 32, 33 and 34. That is, nodes 31 and 32 are determined or calculated from qualified node 21, and nodes 33 and 34 are determined or calculated from qualified node 25. As mentioned above, note that potential nodes are only projected within the bounds of the highway (i.e., within the left and right shoulder/lane borders 70, 72, and not onto the shoulders 66, 68). Here in FIG. 8, nodes 32 and 33 are shown in solid black circles, indicating that their respective collision potentials CP were too high, apparently because of the close proximity to the stalled vehicle 52.

Figure 9:
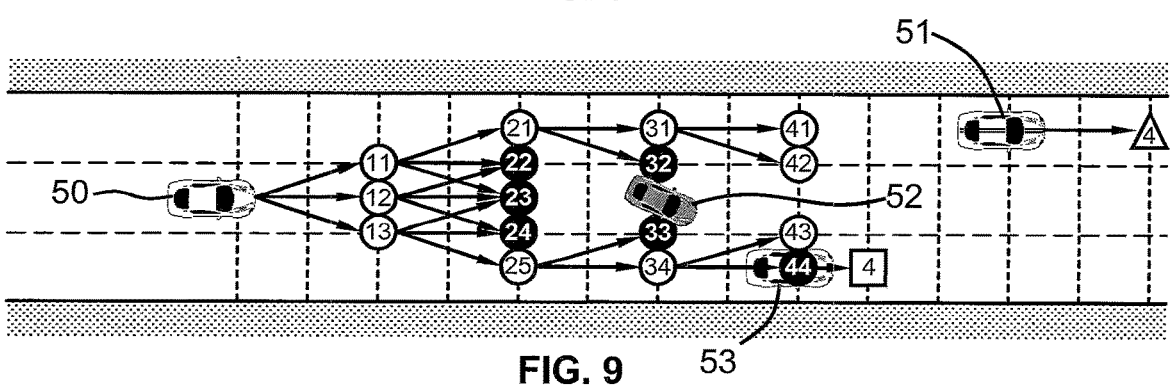

In FIG. 9, which goes from $t_3$ to $t_4$, newly projected nodes 41 and 42 are determined or calculated from qualified node 31, and newly projected nodes 43 and 44 are determined or calculated from qualified node 34. Here, node 44 is shown as a solid black circle, indicating that its collision potential CP is unacceptably high (i.e., compared to the pertinent collision threshold $CP_{threshold}$), apparently because of its close proximity behind the projected location of the third/slow vehicle 53 (represented by the square labeled with a "4").

FIG. 10 shows the host vehicle 50, the obstacles 51, 52, 53 and all of the projected locations $L_i$, $O_i$ for times $t_0$ through $t_4$ all on one graph or plot, synced with successive "sub-graph" views of the projected locations $L_i$, $O_i$ at times $t_0$, $t_1$, $t_2$, $t_3$ and $t_4$ (with the projected locations $L_i$, $O_i$ for times $t_0$ and $t_4$ are plotted together on the same graph). Again, note that the host vehicle nodes are represented by circles, the first (fast) obstacle's nodes are represented by triangles, the second (stalled) obstacle's node is represented by a cross, and the third (slow) obstacle's nodes are represented by squares. Here, a "0" label is used to represent initial nodes (corresponding to time $t_0$), and the labels "1", "2", "3" and "4" represent times $t_1$, $t_2$, $t_3$ and $t_4$, respectively. (The squares labeled "1" and "3" are covered up by the circles labeled "34" and "44", respectively.)

The first sub-graph (i.e., step i=0, corresponding to time $t_0$) shows the initial host vehicle location $L_{HV}$, the initial first/fast obstacle location $L_{VOa}$, the initial second/stalled vehicle location $L_{VOb}$, and the initial third/slow vehicle location $L_{VOc}$.

The second sub-graph (i.e., step i=1, corresponding to time $t_1$) shows the three host vehicle locations $L_{11}$, $L_{12}$, $L_{13}$ which are projected from the initial host vehicle location $L_{HV}$, as well as the first, second and third projected obstacle locations $O_{1a}$, $O_{1b}$, $O_{1c}$ which are projected from the initial first, second and third obstacle locations $L_{VOa}$, $L_{VOb}$, $L_{VOc}$, respectively.

The third sub-graph (i.e., step i=2, corresponding to time $t_2$) shows the five host vehicle locations $L_{21}$, $L_{22}$, $L_{23}$, $L_{24}$, $L_{25}$ which are projected from the previous host vehicle locations $L_{11}$, $L_{12}$, $L_{13}$, as well as the next set of projected obstacle locations $O_{2a}$, $O_{2b}$, $O_{2c}$ which are projected from the respective previous obstacle locations $O_{1a}$, $O_{1b}$, $O_{1c}$. Note that projected host vehicle locations $L_{22}$, $L_{23}$ and $L_{24}$ are struck through, to indicate that these three nodes are not "qualified" locations.

The fourth sub-graph (i.e., step i=3, corresponding to time $t_3$) shows the four host vehicle locations $L_{31}$, $L_{32}$, $L_{33}$, $L_{34}$ which are projected from the previous qualified host vehicle locations $L_{21}$, $L_{25}$, as well as the next set of projected obstacle locations $O_{3a}$, $O_{3b}$, $O_{3c}$ which are projected from the respective previous obstacle locations $O_{2a}$, $O_{2b}$, $O_{2c}$. Note that projected host vehicle locations $L_{32}$ and $L_{33}$ are struck through, to indicate that these two nodes are not "qualified" locations.

And returning once again to the first sub-graph (which also represents step i=4, corresponding to time $t_4$), the four host vehicle locations $L_{41}$, $L_{42}$, $L_{43}$, $L_{44}$ are shown which are projected from the previous qualified host vehicle locations $L_{31}$, $L_{34}$, as well as the next set of projected obstacle locations $O_{4a}$, $O_{4c}$ which are projected from the respective previous obstacle locations $O_{3a}$, $O_{3c}$. Note that projected host vehicle location $L_{44}$ is struck through, to indicate that this node is not a "qualified" projected host vehicle location. Also note that projected obstacle location $O_{3b}$ is not shown in this sub-graph, because it would occupy the same spot where $L_{VOb}$ is located.)

According to another embodiment, a method 200 of graph-based path planning for a host vehicle 50 includes: (i) receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle; (ii) calculating one or more projected host vehicle locations $L_i$ using $L_i = f_{k1}$ (i, $L_{HV}$, $H_{HV}$, $H_{DEV}$, $S_{HV}$, $S_{DEV}$, $T_H$, E, G), where $f_k$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal; (iii) computing a respective projected obstacle location $O_i$ for each obstacle using $O_i = f_{k2}$ (i, $L_{VO}$, $H_{VO}$, $S_{VO}$, $T_H$, E), where $f_{k2}$ is a second kinematic function for generating the respective projected obstacle location $O_i$ for each obstacle; (iv) determining a respective collision potential CP between each projected host vehicle location $L_i$ and each projected obstacle location $O_i$, wherein each collision potential CP is associated with a respective projected host vehicle location $L_i$ and wherein the collision potential CP is defined by $CP=1-\{1/[1+e\hat{\ }-(d-D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance; and (v) until a predetermined maximum number of steps $i_{max}$ is reached, and while at least one projected host vehicle location $L_i$ is a qualified projected host vehicle location $L_i$ defined as a projected host vehicle location $L_i$ in which each of its associated collision potentials is below a collision threshold, repeating the steps of: (a) incrementing the step number i; (b) repeating the calculating step for each respective qualified projected host vehicle location $L_i$ to generate one or more additional projected host vehicle locations $L_i$ where the respective qualified projected host vehicle location is used for $L_{HV}$, (c) repeating the computing step to generate an additional projected obstacle location $O_i$ for each respective obstacle where the current projected obstacle location for each respective obstacle is used for $L_{VO}$, and (d) repeating the determining step between each additional projected host vehicle location $L_i$ and each additional projected obstacle location $O_i$.

This method 200 may further include the step of ignoring duplicate projected host vehicle locations $L_i$, and may also or alternatively include the step of selecting an optimum sequence from the host vehicle location $L_{HV}$ through one or more of the qualified projected host vehicle locations based on minimizing an aggregate collision potential using a Dijkstra algorithm. At least one correction factor relating to environmental information E may be applied to the respective predetermined safe threshold distance $D_{SAFE}$. And the method 200 may further include (as part of the calculating step) the step of adjusting the host vehicle speed $S_{HV}$ by up to $S_{DEV}$ at each of the one or more projected host vehicle locations $L_i$ according to one or more predetermined velocity profiles 80.

According to yet another embodiment, a controller 100 for planning a path for a host vehicle is provided, in which the controller 100 is configured to execute the steps of: (i) receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle; (ii) calculating one or more projected host vehicle locations $L_i$ using $L_i=f_{k1}$ (i, $L_{HV}$, $H_{HV}$, $H_{DEV}$, $S_{HV}$, $S_{DEV}$, $T_H$, E, G), where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal; (iii) computing a respective projected obstacle location $O_i$ for each obstacle using $O_i=f_{k2}$ (i, $L_{VO}$, $H_{VO}$, $S_{VO}$, $T_H$, E), where $f_{k2}$ is a second kinematic function for generating the respective projected obstacle location $O_i$ for each obstacle; (iv) determining a respective collision potential CP between each projected host vehicle location $L_i$ and each projected obstacle location $O_i$, wherein each collision potential CP is associated with a respective projected host vehicle location $L_i$; and (v) until a predetermined maximum number of steps $i_{max}$ is reached, and while at least one projected host vehicle location $L_i$ is a qualified projected host vehicle location $L_i$ defined as a projected host vehicle location $L_i$ in which each of its associated collision potentials is below a collision threshold $CP_{threshold}$, repeating the steps of: (a) incrementing the step number i; (b) repeating the calculating step for each respective qualified projected host vehicle location $L_i$ to generate one or more additional projected host vehicle locations $L_i$ where the respective qualified projected host vehicle location is used for $L_{HV}$, (c) repeating the computing step to generate an additional projected obstacle location $O_i$ for each respective obstacle where the current projected obstacle location for each respective obstacle is used for $L_{VO}$, and (d) repeating the determining step between each additional projected host vehicle location $L_i$ and each additional projected obstacle location $O_i$.

In the configuration of the controller 100, the collision potential CP may be defined by the expression $CP=1-\{1/[1+e\hat{\ }-(d-D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance. The controller 100 may be further configured to execute the step of selecting an optimum sequence from the host vehicle location $L_{HV}$ through one or more of the qualified projected host vehicle locations based on minimizing an aggregate collision potential using a Dijkstra algorithm. Additionally, the controller may be configured to execute (as part of the calculating step) the step of adjusting the host vehicle speed $S_{HV}$ by up to $S_{DEV}$ at each of the one or more projected host vehicle locations $L_i$ according to one or more predetermined velocity profiles 80.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A method of path planning for a host vehicle, comprising:
   receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle;
   calculating one or more projected host vehicle locations $L_i$ using $L_i=f_{k1}(i, L_{HV}, H_{HV}, H_{DEV}, S_{HV}, S_{DEV}, T_H, E, G)$, where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal;
   computing a respective projected obstacle location $O_i$ for each obstacle using $O_i=f_{k2}(i, L_{VO}, H_{VO}, S_{VO}, T_H, E)$, where $f_{k2}$ is a second kinematic function for generating the respective projected obstacle location $O_i$ for each obstacle;
   determining a respective collision potential between each projected host vehicle location $L_i$ and each projected obstacle location $O_i$, wherein each collision potential is associated with a respective projected host vehicle location $L_i$;
   until a predetermined maximum number of steps $i_{max}$, is reached, and while at least one projected host vehicle location $L_i$ is a qualified projected host vehicle location $L_i$ defined as a projected host vehicle location $L_i$ in which each of its associated collision potentials is below a collision threshold, repeating the steps of:
   incrementing the step number i;
      repeating the calculating step for each respective qualified projected host vehicle location $L_i$ to generate one or more additional projected host vehicle locations $L_i$ where the respective qualified projected host vehicle location is used for $L_{HV}$;
      repeating the computing step to generate an additional projected obstacle location $O_i$ for each respective obstacle where the current projected obstacle location for each respective obstacle is used for $L_{VO}$; and
      repeating the determining step between each additional projected host vehicle location $L_i$ and each additional projected obstacle location $O_i$; and
   controlling at least one of a steering subsystem, a throttle subsystem and a braking subsystem of the host vehicle based on an optimum sequence from the host vehicle location $L_{HV}$ through one or more of the qualified projected host vehicle locations.

2. A method according to claim 1, further comprising: ignoring duplicate projected host vehicle locations $L_i$.

3. A method according to claim 1, further comprising: selecting the optimum sequence based on minimizing an aggregate collision potential using a Dijkstra algorithm.

4. A method according to claim 1, wherein the collision potential is defined by $CP=1-\{1/[1+e^{\wedge}-(d-D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance.

5. Method according to claim 4, wherein at least one correction factor relating to environmental information E is applied to the respective predetermined safe threshold distance $D_{SAFE}$.

6. A method according to claim 1, wherein the respective obstacle speed $S_{VO}$ and obstacle heading $H_{VO}$ for each obstacle are maintained for all steps.

7. A method according to claim 1, further comprising, as part of the calculating step:
   adjusting the host vehicle speed $S_{HV}$ by up to $S_{DEV}$ at each of the one or more projected host vehicle locations according to one or more predetermined velocity profiles.

8. A method according to claim 7, wherein each of the predetermined velocity profiles is one or more of an acceleration profile, a deceleration profile, a constant speed profile, a coasting profile, a regenerative braking profile, an emergency acceleration profile and emergency stop profile.

9. A method according to claim 1, wherein the predetermined radius is a predetermined span of zones about the host vehicle.

10. Method according to claim 1, wherein each obstacle is a neighboring vehicle or object.

11. A method according to claim 1, wherein:
   the environmental information E includes one or more of: number and arrangement of lanes and shoulders; traffic flow direction for each lane and shoulder; road surface type of each lane and shoulder; location, message/command and effective area of traffic signs/traffic signals; speed limits; local weather conditions; and proximity, speed and heading of each obstacle; and
   the goal G includes one or more of: going straight, turning left, turning right, accelerating, decelerating, maintaining a current speed, maintaining a vehicle speed at or above a minimum safe speed, maintaining the vehicle speed at or below a maximum safe speed, maintaining a minimum following distance or more behind another vehicle, merging into an adjacent lane, passing another vehicle, avoiding a passing lane when not passing, avoiding one or both shoulders, stopping at a designated location, and taking evasive action to avoid obstacles.

12. A method of graph-based path planning for a host vehicle, comprising:
   receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle;
   calculating one or more projected host vehicle locations $L_i$ using $L_i=f_{k1}(i, L_{HV}, H_{HV}, H_{DEV}, S_{HV}, S_{DEV}, T_H, E, G)$, where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal;
   computing a respective projected obstacle location $O_i$ for each obstacle using $O_i=f_{k2}(i, L_{VO}, H_{VO}, S_{VO}, T_H, E)$, where $f_{k2}$ is a second kinematic function for generating the respective projected obstacle location $O_i$ for each obstacle;
   determining a respective collision potential between each projected host vehicle location $L_i$ and each projected obstacle location $O_i$, wherein each collision potential is associated with a respective projected host vehicle location $L_i$ and wherein the collision potential is defined by $CP=1-\{1/[1+e\char94-(d-D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance;

until a predetermined maximum number of steps $i_{max}$ is reached, and while at least one projected host vehicle location $L_i$ is a qualified projected host vehicle location $L_i$ defined as a projected host vehicle location $L_i$ in which each of its associated collision potentials is below a collision threshold, repeating the steps of:

incrementing the step number i;

repeating the calculating step for each respective qualified projected host vehicle location $L_i$ to generate one or more additional projected host vehicle locations $L_i$ where the respective qualified projected host vehicle location is used for $L_{HV}$, repeating the computing step to generate an additional projected obstacle location $O_i$ for each respective obstacle where the current projected obstacle location for each respective obstacle is used for $L_{VO}$, and repeating the determining step between each additional projected host vehicle location $L_i$ and each additional projected obstacle location $O_i$; and controlling at least one of a steering subsystem, a throttle subsystem and a braking subsystem of the host vehicle based on an optimum sequence from the host vehicle location $L_{HV}$ through one or more of the qualified projected host vehicle locations.

13. A method according to claim 12, further comprising: ignoring duplicate projected host vehicle locations $L_i$.

14. A method according to claim 12, further comprising: selecting the optimum sequence based on minimizing an aggregate collision potential using a Dijkstra algorithm.

15. A method according to claim 12, wherein at least one correction factor relating to environmental information E is applied to the respective predetermined safe threshold distance $D_{SAFE}$.

16. A method according to claim 12, further comprising, as part of the calculating step:

adjusting the host vehicle speed $S_{HV}$ by up to $S_{DEV}$ at each of the one or more projected host vehicle locations according to one or more predetermined velocity profiles.

17. A controller for planning a path for a host vehicle, the controller configured to execute the steps of:

receiving a host vehicle heading $H_{HV}$, a host vehicle speed $S_{HV}$, a host vehicle location $L_{HV}$, environmental information E, and a respective obstacle heading $H_{VO}$, obstacle speed $S_{VO}$ and obstacle location $L_{VO}$ for each obstacle within a predetermined radius about the host vehicle;

calculating one or more projected host vehicle locations $L_i$ using $L_i=f_{k1}(i, L_{HV}, H_{HV}, H_{DEV}, S_{HV}, S_{DEV}, T_H, E, G)$, where $f_{k1}$ is a first kinematic function for generating the one or more projected host vehicle locations $L_i$, i is a step number, $H_{DEV}$ and $S_{DEV}$ are allowable deviations for the host vehicle heading $H_{HV}$ and the host vehicle speed $S_{HV}$, respectively, $T_H$ is a hypothesis time step, and G is a goal;

computing a respective projected obstacle location $O_i$ for each obstacle using $O_i=f_{k2}(i, L_{VO}, H_{VO}, S_{VO}, T_H, E)$, where $f_{k2}$ is a second kinematic function for generating the respective projected obstacle location $O_i$ for each obstacle;

determining a respective collision potential between each projected host vehicle location $L_i$ and each projected obstacle location $O_i$, wherein each collision potential is associated with a respective projected host vehicle location $L_i$;

until a predetermined maximum number of steps $i_{max}$ is reached, and while at least one projected host vehicle location $L_i$ is a qualified projected host vehicle location $L_i$ defined as a projected host vehicle location $L_i$ in which each of its associated collision potentials is below a collision threshold, repeating the steps of:

incrementing the step number i;

repeating the calculating step for each respective qualified projected host vehicle location $L_i$ to generate one or more additional projected host vehicle locations $L_i$ where the respective qualified projected host vehicle location is used for $L_{HV}$, repeating the computing step to generate an additional projected obstacle location $O_i$ for each respective obstacle where the current projected obstacle location for each respective obstacle is used for $L_{VO}$, and repeating the determining step between each additional projected host vehicle location $L_i$ and each additional projected obstacle location $O_i$; and controlling at least one of a steering subsystem, a throttle subsystem and a braking subsystem of the host vehicle based on an optimum sequence from the host vehicle location $L_{HV}$ through one or more of the qualified projected host vehicle locations.

18. A controller according to claim 17, wherein the collision potential is defined by $CP=1-\{1/[1+e\char94-(d-D_{SAFE}/2)]\}$, where CP is the collision potential, d is a respective distance between each projected host vehicle location $L_i$ and each projected obstacle location $O_i$, and $D_{SAFE}$ is a respective predetermined safe threshold distance.

19. A controller according to claim 17, wherein the controller is further configured to execute the step of:

selecting the optimum sequence based on minimizing an aggregate collision potential using a Dijkstra algorithm.

20. A controller according to claim 17, wherein the controller is further configured to execute, as part of the calculating step, the step of:

adjusting the host vehicle speed $S_{HV}$ by up to $S_{DEV}$ at each of the one or more projected host vehicle locations according to one or more predetermined velocity profiles.

* * * * *